United States Patent [19]
Hooper et al.

[11] Patent Number: 5,671,225
[45] Date of Patent: Sep. 23, 1997

[54] DISTRIBUTED INTERACTIVE MULTIMEDIA SERVICE SYSTEM

[75] Inventors: Donald F. Hooper, Shrewsbury; Dave M. Tongel, Worcester; Michael B. Evans, Upton, all of Mass.

[73] Assignee: Digital Equipment Corporation, Maynard, Mass.

[21] Appl. No.: 522,966

[22] Filed: Sep. 1, 1995

[51] Int. Cl.⁶ .................................................. H04J 3/16
[52] U.S. Cl. .................................................. 370/468; 348/12
[58] Field of Search .................................. 370/95.1, 95.2, 370/95.3, 110.1, 94.1, 60, 94.2, 85.13, 485, 486, 489, 256, 312, 310, 314, 329, 345, 346, 347, 389, 390, 401, 408, 468, 524, 94.3; 348/423, 6, 7, 12, 15, 17; 379/92, 93, 94, 95

[56] References Cited

U.S. PATENT DOCUMENTS

| | | | |
|---|---|---|---|
| 5,195,092 | 3/1993 | Wilson et al. | 370/94.2 |
| 5,287,447 | 2/1994 | Miller et al. | 395/157 |
| 5,325,423 | 6/1994 | Lewis | 379/90 |
| 5,351,276 | 9/1994 | Doll, Jr. et al. | 379/67 |
| 5,371,532 | 12/1994 | Gelman | 348/7 |
| 5,541,919 | 7/1996 | Yong et al. | 370/61 |
| 5,544,161 | 8/1996 | Bigham et al. | 370/60 |

*Primary Examiner*—Dang Ton
*Attorney, Agent, or Firm*—A. Sidney Johnston; Dirk Brinkman; Ronald C. Hudgens

[57] ABSTRACT

In a distributed interactive multimedia service system, a client application of a set-top box located at a customer premises generates an attach request. A session manager, in response to receiving the attach request via a network, generates an allocation request and a create request. A resource manager, in response to the allocation request, allocates resources of a plurality of multimedia servers. The resources can include processor, memory, disk, and network resources. A media stream manager, in response to the create request, creates a multimedia stream. The session manager, in response to the resources being allocated, and the multimedia stream being created, launches a selected one of a plurality of multimedia services in the plurality of multimedia servers. The selected service provides multimedia information to the set-top box via the multimedia stream. The system includes a memory storing the plurality of multimedia services in a hierarchical tree structure having nodes representing composite and elemental services.

14 Claims, 8 Drawing Sheets

DISTRIBUTED INTERACTIVE MULTIMEDIA SERVICE SYSTEM

FIELD OF THE INVENTION

This invention relates generally to distributed computer environments, and more particularly to providing interactive multimedia services using distributed computer environments.

BACKGROUND OF THE INVENTION

In the prior art, distributed computer environments (DCE) are well known. In a typical DCE, one or more client processors (clients) communicate with server processors (servers) via a communications network. Users execute client applications which, from time-to-time, require client services.

The architectures of prior art distributed computer environments are usually configured to serve a relatively small population, maybe hundreds of users, having access to a known number of client work stations or personal computers. The communications networks tend to be localized as, for example, token ring or baseband networks. Local area networks (LAN) typically have predeterminable dimensions in terms of physical media, bandwidth, and protocol. The communications paths from the client to the server, and from the server to the client tend to be singular and symmetrical.

The users and client applications tend to be sophisticated, e.g., spread-sheets, word-processing. The services tend to be narrow in terms of variety, complexity, and resource requirements, for example, consider the ubiquitous database and print servers found in many LAN based distributed computer systems.

It is a problem to scale the architecture of distributed computer environments to handle interactive multimedia services. The problems are manifold. The number of users of interactive services is expected to number in the millions, where a single client may have multiple simultaneous interactive sessions in progress. The services can number in the thousands. The delivery of the services requires the cooperation of a number of entities. Video information providers (VIPs) supply multimedia assets, service providers (SP) own and operate the service systems, and network operators provide transport. Customer premises equipment (CPE) manufacturers supply TVs and set-top boxes.

However, the client applications tend to be relatively simplistic. In essence, with a hand-held remote controller, an unsophisticated user, e.g., a child, can manipulate state-of-the-art high-speed 64-bit video servers, and many gigabytes of data. The services can be complex and varied, e.g., video-on-demand, games, catalogue services, home-shopping, tele-medicine, distance learning, restaurant food take-out, financial services, etc. The multimedia assets can be in various forms, including files, relational databases, and encoded video programs.

The server locations can be as widely distributed as the clients, and the network which connects the servers and clients is in reality an intersecting grid of millions of physical and virtual circuits. The communications characteristics of any of the allocated circuits, typically asymmetrical, be it via satellite, cable, or optic-fibre, may not be revealed until a user requests access to a service. The connectivity arrangements can include broadcast, multicast, point-to-point, multipoint-to-point, and multipoint-to-multipoint.

Simply stated, the desired architecture must be scalable to satisfy the service needs of many subscribers who can demand the downloading of millions of bits of data per second at the push of a remote button. Specifically, in response to simple client applications generating a small number of signals, complex computer resources need to be allocated and managed while under stress of a continuously changing service load. For these problems the invention provides solutions, of which specific embodiments are described below.

SUMMARY OF THE INVENTION

In a distributed interactive multimedia service system, a client application of a set-top box connected to a television located at a customer premises generates an attach request. The attach requests can be generated in response to user commands originating in a hand-held remote controller device. In one aspect of the invention, a session manager executing in a gateway router, in response to receiving the attach request via the network, generates an allocation request and a create request.

In another aspect of the invention, a resource manager of a server management unit, in response to the allocation request, allocates physical resources of a plurality of multimedia servers. The resources can include processors, memory, disk, and network bandwidth. A media stream manager, in response to the create request, creates a multimedia stream. The multimedia stream is a virtual circuit to connect directly to the set-top box.

The session manager, in response to the resources being allocated and the multimedia stream being created, launches a selected one of a plurality of multimedia services in the plurality of multimedia servers. The selected service, while executing in the servers, provides multimedia information to the set-top box via the multimedia stream.

Another aspect of the invention includes a memory storing the plurality of multimedia services in a hierarchical tree structure. The hierarchical tree structure includes nodes, where each node represents one of the plurality of multimedia services. A particular multimedia service can include a composite service, where the composite service further includes one or more elemental services. The elemental services can be typed either as an optional service or a required service. The elemental services are associated with multimedia content. And the elemental service, in response to commands received from the set-top box, provide functions to access and transport the multimedia content to the set-top box via the media stream.

DETAILED DESCRIPTION OF A PREFERRED EMBODIMENT

Figure 1:
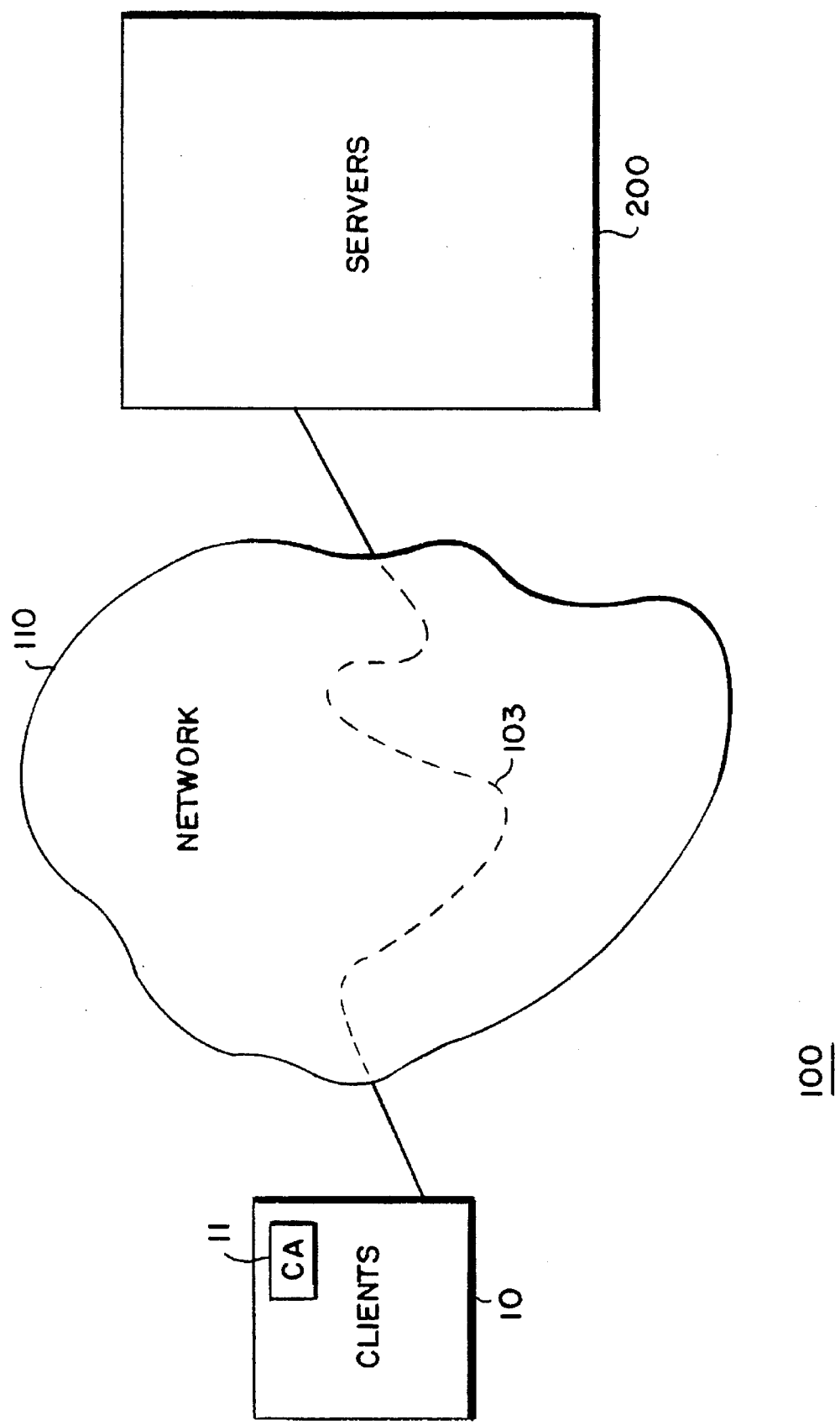
FIG. 1 is a top-level block diagram of a distributed computer environment (DCE) which uses the invention.

FIG. 1 shows a distributed computer environment (DCE) 100 for providing multimedia services. The multimedia services can include interactive services, broadcast services, and transaction services such a home-shopping. The services can access multimedia information assets such as video/ audio "stream" data, files, and databases. The DCE 100 includes servers 200 connected to clients 10 by a communications network 110 having circuits 103. Each client 10 can be in the form of set-top boxes having processors for decoding and controlling service sessions using client applications (CA) 11.

Users of the client 10 can initiate service requests with hand-held remote controllers, and the servers 200 reply. During a service session, server and network resources are temporarily allocated to the client 10. Server resources can include computer processors, memories, disks, network resources can include one of the communication paths 103. During a service session the path 103 is partitioned into bi-directional data and control paths.

Figure 2:
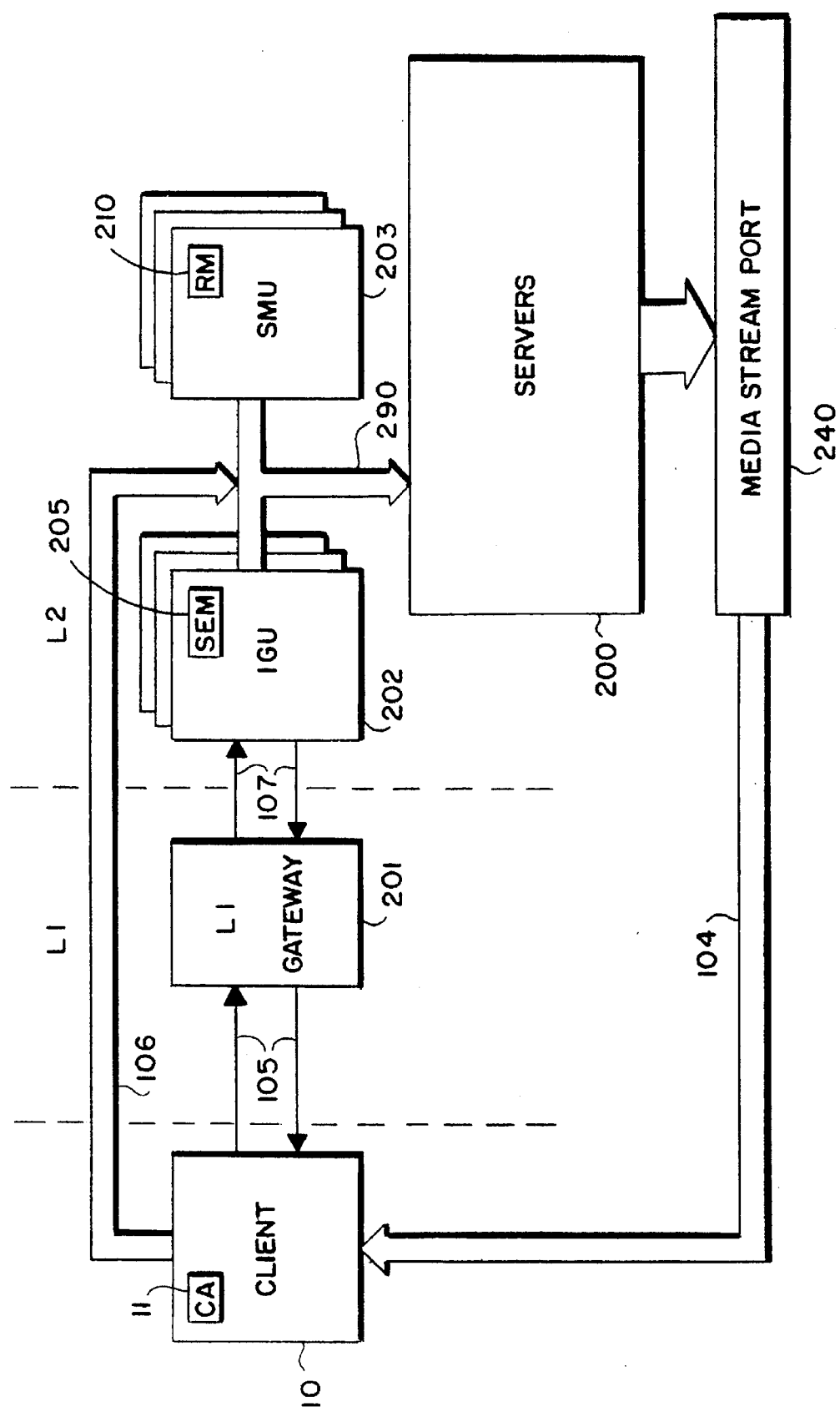
FIG. 2 is a detailed block diagram of the DCE of FIG. 1.

Turning now to FIG. 2, there is shown one client 10 connected to servers 200. The communication path 103 of FIG. 1 can be partitioned into a high-bandwidth forward data path 104, a high-bandwidth back data path 106, and low-bandwidth bi-directional control paths 105. Access to the services provided by the servers 200 is controlled by gateways which partition the domain of the services in to level 1 (L1) and level 2 (L2) services.

A L1 gateway router 201 is used to establish a session between the client set-top box 10 and the servers 200. The L1 gateway router 201 provides for network control, session set-up and tear-down, and routing between clients and servers. In the United States, level 1 refers to the government regulated, e.g., FCC, portion of the client/server interface. Level 1 service provide no significant multimedia content. Level 1 services can be compared to "white-pages directory information" services that are available from telephone companies.

A L2 interactive gateway unit or router (IGU) 202, connected to the L1 gateway 201 by control lines 107, allows access to unregulated level 2 services. The level 2 services include provider supplied multimedia content, including all video-on-demand services. A session manger (SEM) 205 of the IGU router 202 can perform user authentication using a subscriber database, and upon validation route service requests to the servers 200. For a system supporting a large number of users, there may be several IGUs 202.

A server management unit (SMU) 203 coordinates requests for server resources. Server resources are the measurable functional components of the system, for example processors, memories, disks, buffers, and network bandwidth. More specifically, the resources are managed by a resource manager (RM) 210 of the SMU 203. The SMU 203 maintains the metrics which define the functional components of the system. The metrics include dynamic information about clients, sessions, server assignments, port assignments, network traffic, server bandwidth, media assets, memory allocations, etc. There may be several SMUs 203 to handle a distributed content database, the SMUs 203 can be paired for redundancy and fault tolerance.

The servers 200 include generalized and specialized processor-based sub-systems. For example, content library servers can be configured as a tape or optical juke boxes having robotic mechanisms to access a large number of off-line and on-line high-capacity tapes and optical disks which store multimedia content. Interactive media servers can concurrently deliver multiple streams of multimedia data, e.g., MPEG streams, files, and database information. Each server can include one or more processors, memory, and disk storage.

Outputs of the servers 200 are connected to a "video pump" including one or more media stream ports 240. The media stream port 240 can include multiplexers to select the servers and a flow controller to supply constant bit rate (CBR) streams to the bulk forward data path 104. The flow controller of the media stream port 240 can encode video data into MPEG format, and package the encoded data into transport packets suitable for communicating over the network 110.

During operation of the DCE 100, e.g., during client/server session described in greater detail below, control data are communicated between the client 10 and the servers 200 via the L1 and L2 gateways 201–202 and the server management unit 203 using the relative low-bandwidth communications paths 105 and 107.

The control data generated by the client 10 can include client requests for services, such as "attach, info, open, close, suspend, resume, play, pause, forward, rewind, stop, read, write," etc, and client supplied identification data.

The control data generated by the servers 200 can include status information, e.g., success/failure, and further control data for the application, to be stored in the client 10. The control data can include addresses or "handles" which allow the client 10 to directly communicate with the services of the servers 200 once a session has been established. Bulk multimedia data transfers from the servers 200 to the client 10, e.g., video streams and files, by-pass the L1 and L2 gateways, and are directly communicated on the high bandwidth forward data channel 104. These multimedia data are the service "multimedia content."

Figure 3:
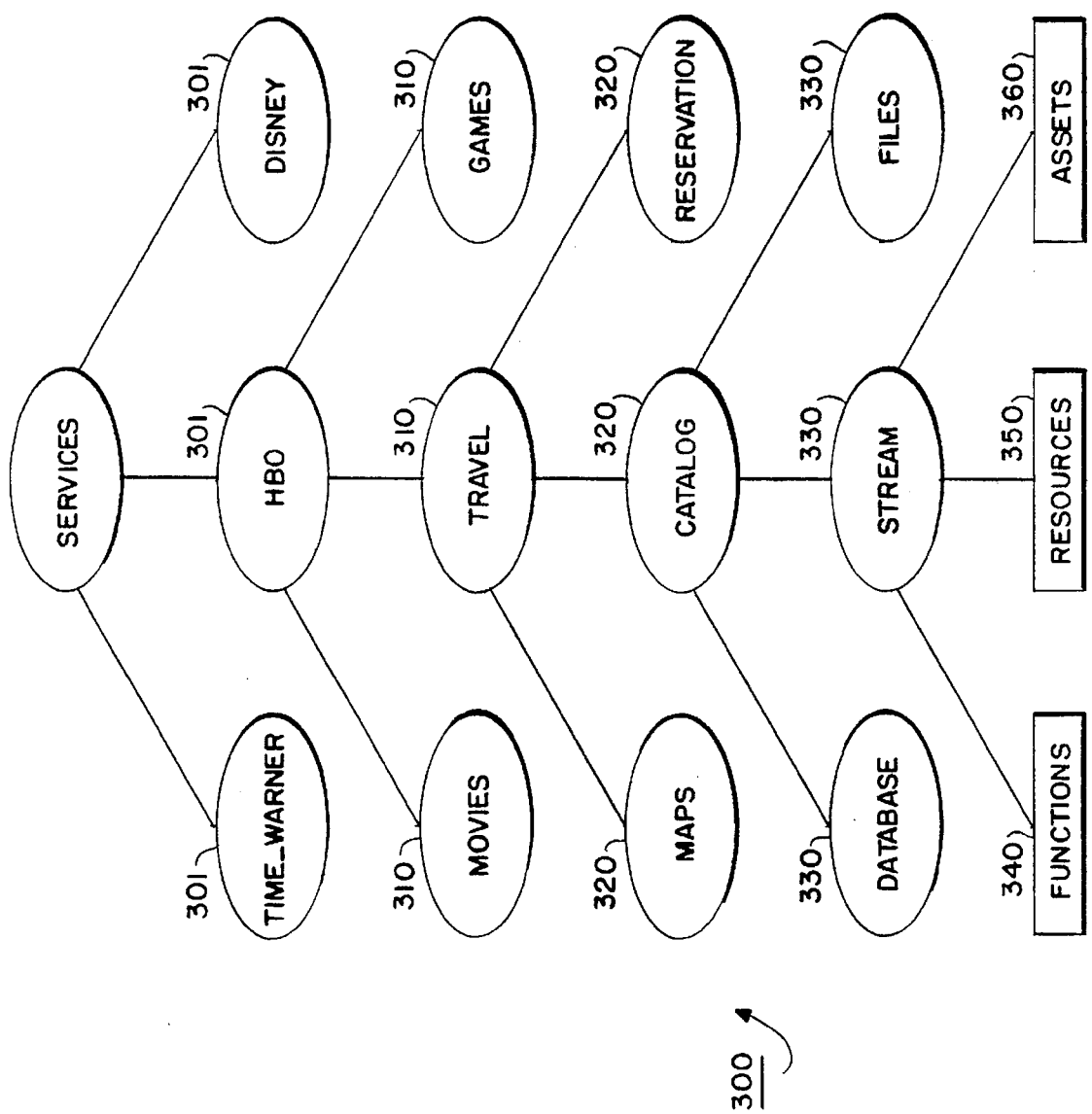
FIG. 3 is a block diagram of a multimedia services database used by the invention.

As shown in FIG. 3, in a preferred embodiment of the invention, services 300 are defined in the domain of the servers 200 as a hierarchical tree structure having "nodes" which can be accessed via directories. The services 300 include processes for providing multimedia content, e.g., assets, to the client 10. The processes execute on the servers 200 to manipulate the content as directed by the user of the client 10. In the hierarchical structure 300, the services are first organized by information providers 301, e.g., HBO, Time-Warner, Disney, etc. During operation of the DCE 100, depending on the identity of the set-top box 10 and the client user, one or more provider services are "exposed" to the client for selection.

Each of the providers 301 can supply named services 310, for example, movies, travel, and games. A service is designated a "composite service" if it includes sub-services 320. For example, the composite travel service includes sub-services 320 maps, catalog, and reservation. Services can be either required or optional. Required child services are opened and have resources allocated when the composite parent service is opened. Optional services are not activated until actually requested by the client. A concurrent service is available concurrently with other services.

At a bottom level of the hierarchy are elemental services 330. The elemental services 330 are designed to deliver multimedia assets 360. Elemental services which manipulate multimedia assets can be, for example, stream, file, and database. Stream services deliver video assests as constant bit rate MPEG streams over line 104. File and database service can deliver information stored in conventional sequential and relational database files.

Associated with the elemental services are functions 340. The functions can be accessed by remote procedure calls (RPCs). For example, a boot service can be used to deliver an initial application programming interface (API) to the set-top box 10. The stream services are manipulated by VCR-like functions to play programs. File and database services use functions such as read and write, and navigational functions.

In order to provide a service to a client, resources 350 are required and allocated. Therefore, associated with the services 300 are resource parameters, such as up/down bandwidth, server location, CPU, disk, and memory usage. Resources are managed and allocated by the resource manager 210 of the SMU 203. For composite services, the resource parameters can include a description of the resources of other required concurrent services. The resources required for a composite service may be less than the sum total of the resources required by the component elemental services.

Figure 4:
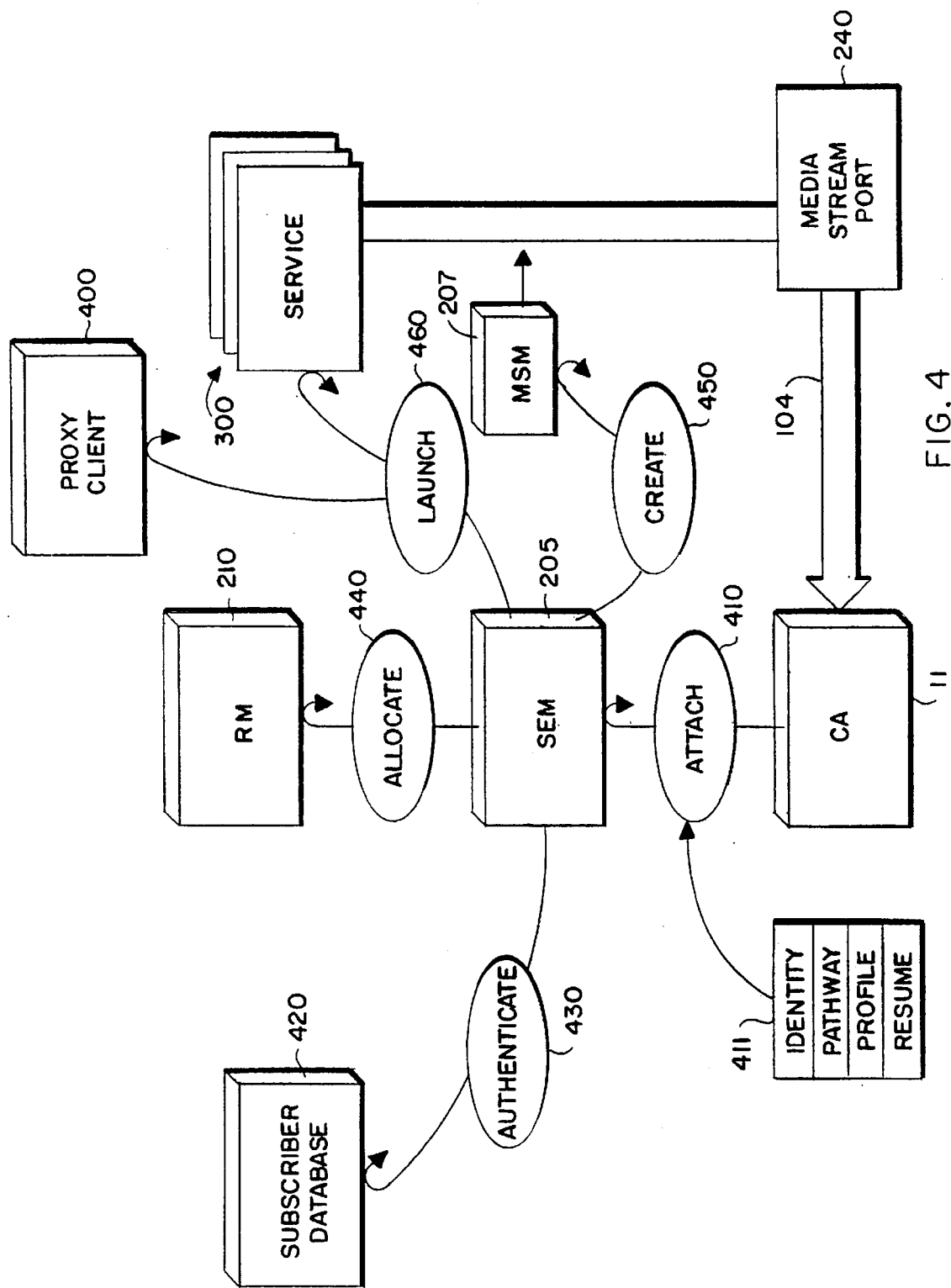
FIGS. 4-8 are flow diagram of interactions between clients and servers of the distributed interactive multimedia services according to a preferred embodiment of the invention.

Now turning to FIG. 4, the functional operation of the DCE 100 is described. As an advantage, the preferred embodiment of the invention minimizes the complexity of the client/server interface, and minimizes the traffic on the low-bandwidth control paths 105. In a preferred embodiment of the invention, the interactions between the client application 11 and the services 300 executing on the servers 200 can be, in pan, via requests in the form of basic remote procedure calls, as shown by the directed arrows. Each RPC can have input arguments. In response to the RPC requests, the services 300 generate reply messages which can include reply information and a status indication as to success or failure of the RPC.

As shown in FIG. 4, the client application 11 initiates a service session by sending an attach request 410 to the SEM 205 of the IGU 202. The attach request 410 can include the identity (address) of the set-top box 11, an initial service pathway, a client profile, and an optional "resume" context, see reference numeral 411. The client address identifies a particular set-top box, and can also include user identification information, such as a unique password. Thus, multiple different users of the same set-top box can be selectively exposed to different services.

The initial service pathway is the default definition of the information service providers 301, and services (nodes) that are to be exposed to the client user. The client profile describes the capabilities of the client set-top box 10, e.g., bandwidth, manufacturer, model, network protocol, etc. This information is used to appropriately format the content for delivery. The resume context, see below, is used by the client 10 to re-attach to previously suspended services.

In response to receiving the attach request 410, the SEM 205 validates the client/user identity against a subscriber database 420 using an authenticate request 430. The authentication reply can include additional information to refine the initial services to be launched for the client 10. Upon a valid authentication, the SEM 205 sends an allocate request 440 to the RM 210. The RM 210 allocates the appropriate resources for the initial services.

The SEM 205 also sends a create request 450 to a media stream manager MSM 207. The MSM "creates" or allocates the media stream port 240. The media stream port 240 is the channel/port that will connect the client 10 to the selected services. The SEM 205 receives the address or "handle" of the media stream port 240 so that the services can be connected to deliver constant bit rate video stream directly to the client.

As a final step, the SEM 205 generates a launch request 460 to launch the selected services in one or more servers 200. Launching means the execution of the processes of the services, and access to the associated content assets are enabled. If the service being launched is a composite service, any required sub-services are also launched. The services can send video streams directly to the client 10 via the media stream port 240. The reply to a successful attach request 460 can include the addresses or "handles" of the launched services. The client application 11 uses these handles to directly communicate with the selected services during subsequent requests.

In an alternative embodiment of the invention, the SEM 205 can also launch a "proxy" client 400. The proxy client 400 is functionally equivalent to the client application 11. However, the proxy client 400 operates in one of the allocated servers 200. The purpose of the proxy client 400 is to simplify the operations of the client set-top box 10, and to simplify the interface between the client application 11 and the services 300 of servers 200.

With the proxy client 400, the client user can simply push buttons on the set-top box 10 or the hand held remote. These basic command signals are transported to the proxy client 400. The proxy client 400 interprets the basic set-top box commands or key clicks, and formulates the substantially more complex RPC calls that are to carry out the user requests. The proxy client 400 can then interact with the services 300 at a more sophisticated level.

This embodiment of the proxy client 400 allows for a fully functional client/server interface with relatively simplistic and low-cost set-top boxes. In fact, with this scheme, the underlying design of the RPC call/response structure can change without modifying any of the customer premises equipment.

Figure 5:
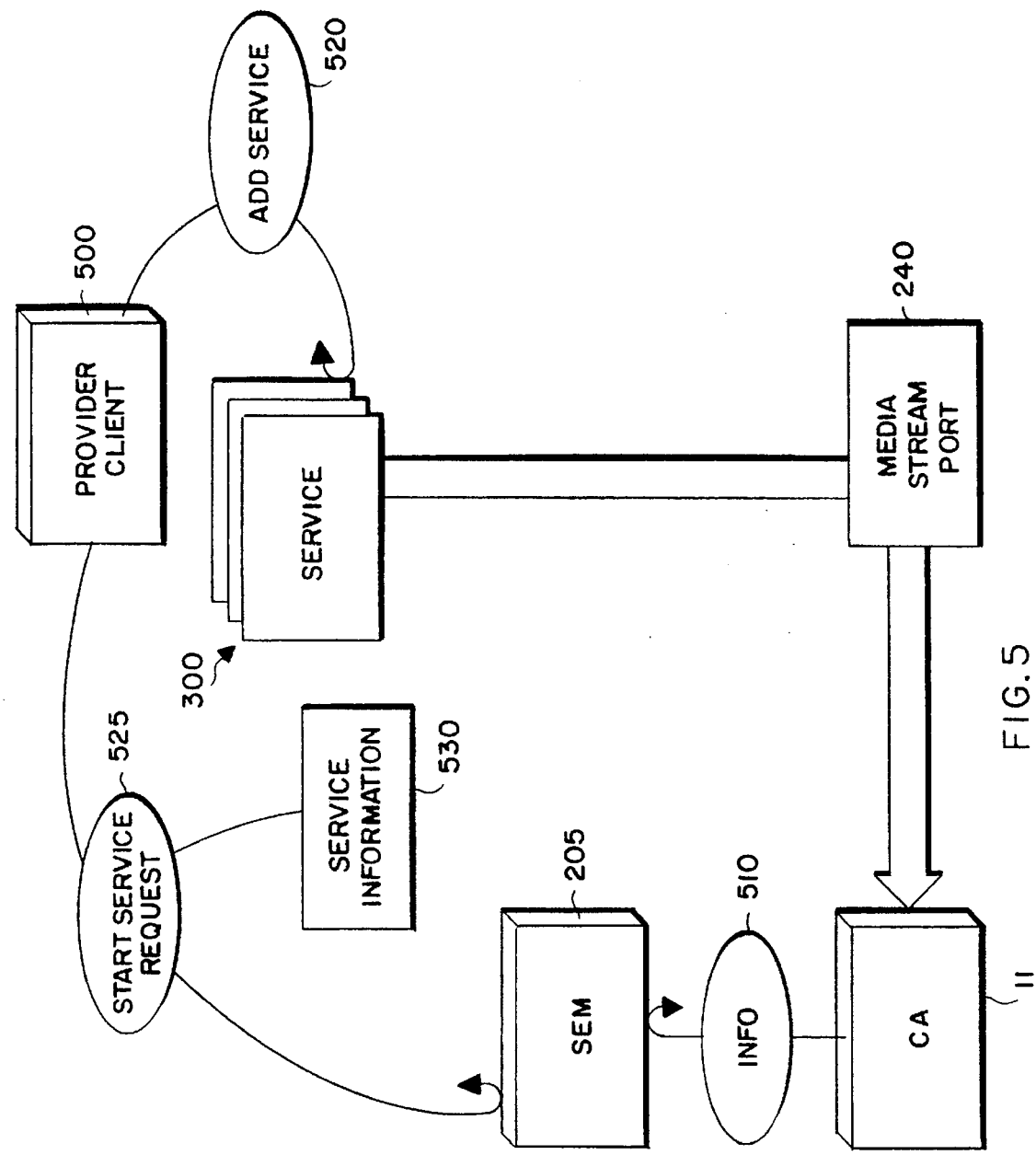

As shown in FIG. 5, the system can also include a provider client application 500. Like the proxy client 400, the provider client 500 executes in the domain of the servers 200. The purpose of the provider client 500 is to configure service offerings of the providers 301, and to load multimedia content, e.g., assets 360 into the database. Therefore, there is one provider client 500 for each of the providers 301 of FIG. 3. Services are added by using the add service request 520.

During operation of the provider client 500, instances, or copies of new services are registered with the SEM 205 by a start service request 525. As part of the registration of a new service, the SEM 205 is provided with information 530 describing the service, including the configuration or hierarchy of the service in the services tree 300 using the start service request 525.

Thus, after the client 10 has been attached to the selected service or services, the client application 11, or the proxy client 400 on behalf of the client 11, can submit an info request 510 to the SEM 205. The SEM 205 forwards the information 530 of the registered services to the client 11. The information 530 can be formatted, in part, as selection menus transferred to the client 10 via the media stream port 240. The user can use the information to select specific elemental services 330.

Figure 6:
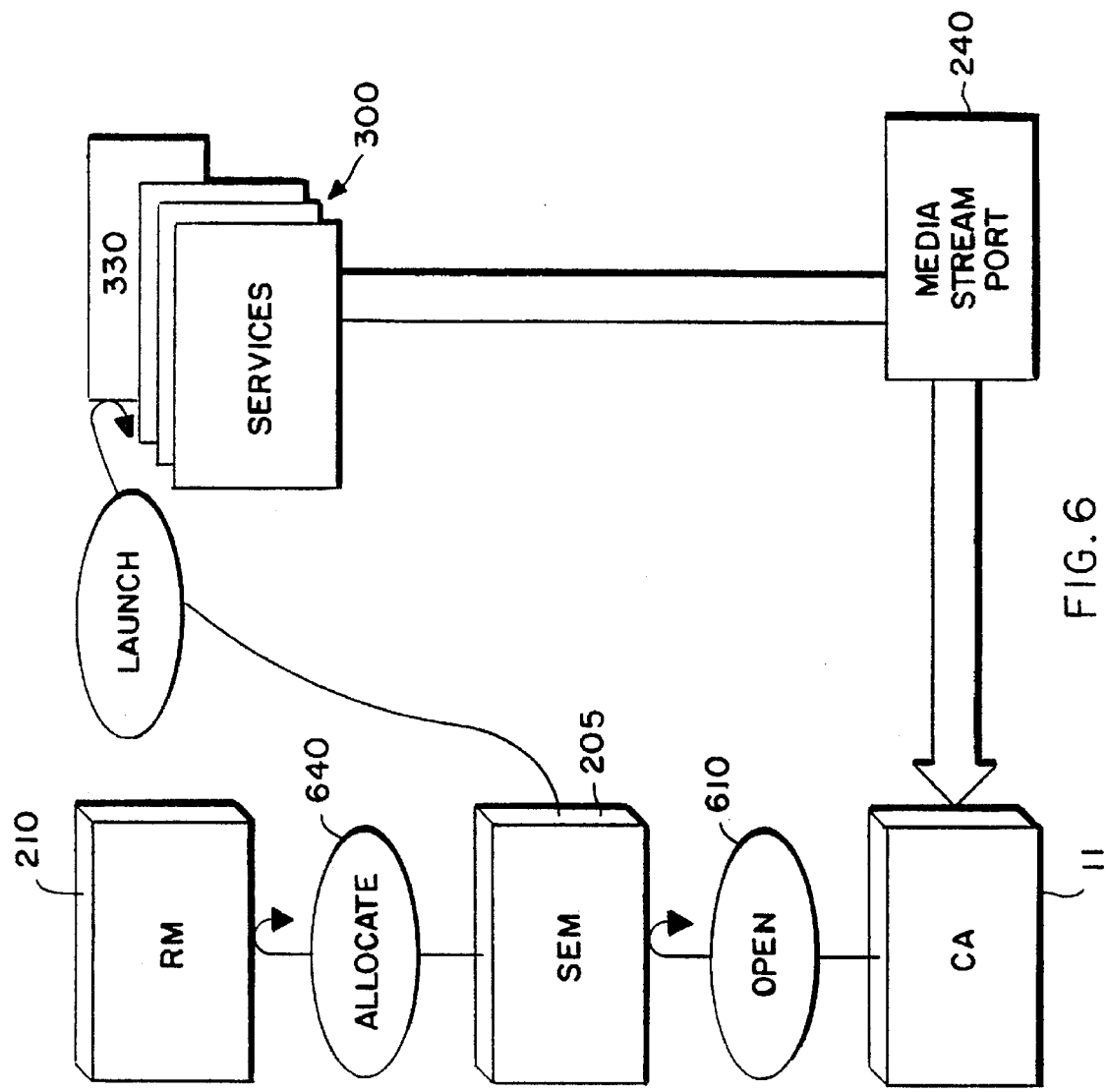

A particular service can be selected for execution by the client application 11 by sending an open request 610, as shown in FIG. 6. The running of the selected service may require the allocation of additional resources, e.g., the SEM 205 makes additional allocation requests 640 to the resource manager 210. Also, the opening of selected services may require the launching of additional services, such as elemental services 330 and the allocating of resources to the assets 360 of the elemental services.

Figure 7:
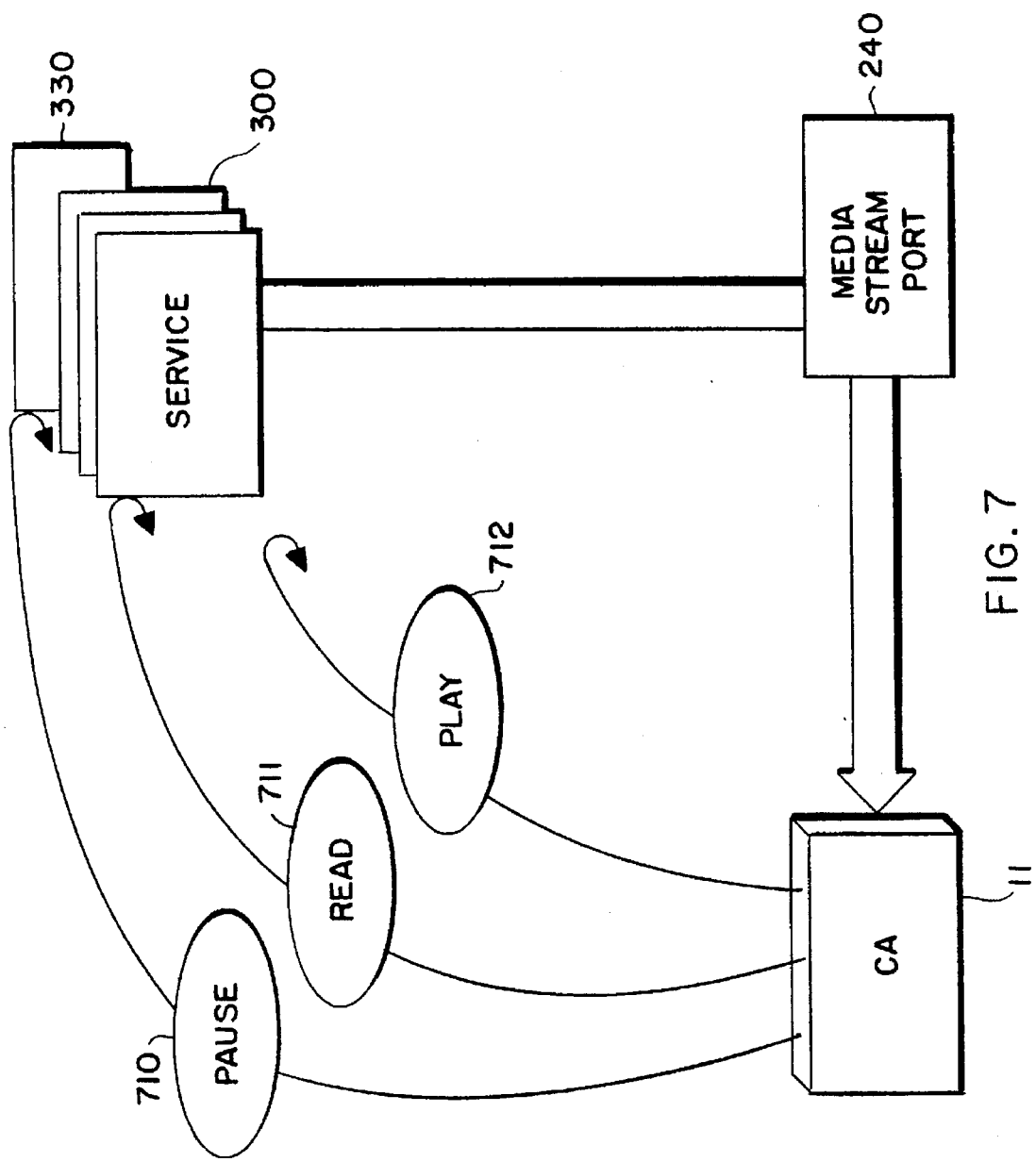

As shown in FIG. 7, after the selected services have been opened, the service can respond directly to functional commands 340, such as play, pause, and read 710–712, which control the delivery of the multimedia content. This means that the client 11, or the proxy client 400 is communicating directly with the services, by-passing the SEM 205. A close request completely tears down the services, and relinquishes any allocated resources. A suspend request preserves a description of the total client/server context. This context can be used in a subsequent re-attach request to resume the suspended services.

Figure 8:
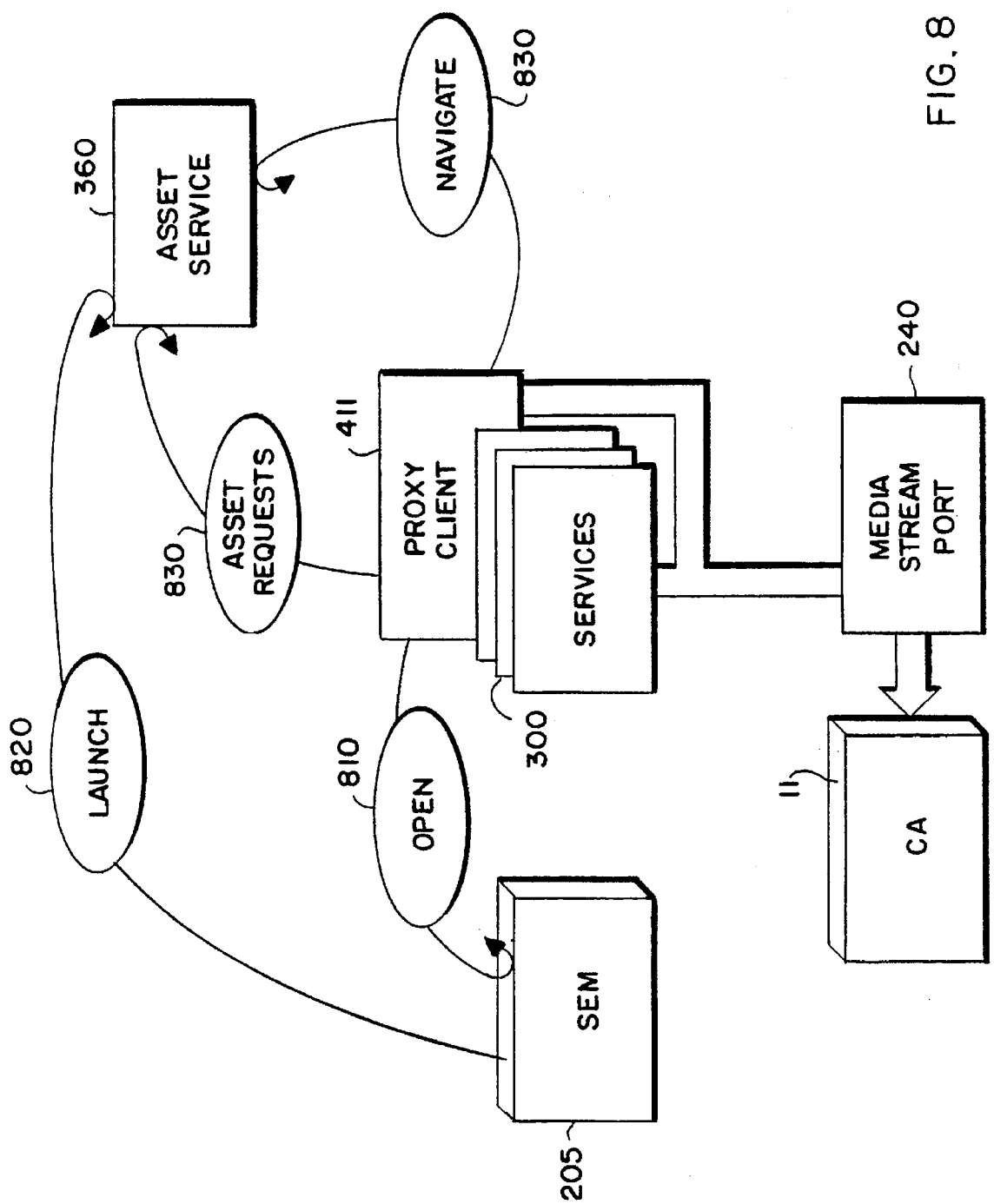

In another alterative embodiment of the invention, as shown in FIG. 8, the proxy client 400 can open an asset service 360 with an open request 810. The asset service is launched by the SEM 205 by a launch asset service request 820. In this case, the proxy client 400 becomes the client of the asset service 360. As an advantage, the proxy client 400 now has direct access to, for example, directory information using asset requests 830. The proxy client 400 can now send more complex file and database transactions, e.g., navigational requests 830 to the asset service 360. These requests can derived from simple menu driven key-click supplied by the user.

The proxy client 400 can format and package reply information for consumption by the client 11 using the media stream port 240 to transport the asset information directly to the client 11. The content can be presented to the media stream port 240 in MPEG encoded form, or otherwise. If the content is not in MPEG encoded form, the encoding can be done by the port 240, while delivering the content.

Disclosed are illustrative embodiments of the invention which allows a user of a client processor to access complex multimedia services provided by server processors. More specifically in a distributed computer environment, subscribers of interactive multimedia services, launch, open, use, and close complex multimedia services via a communications network, the services are provided by processes executing on server processors having access to multimedia assests.

The invention is described using specific terms and examples. It is to be understood that various other adaptations and modifications may be made within the spirit and scope of the invention. Therefore, it is the object of the appended claims to cover such all such variations and modifications as come within the true spirit and scope of the invention.

We claim:

1. A distributed interactive multimedia service system, comprising:
    a session manager, in response to receiving an attach request from a customer premises set-top box connected to the session manger via a network, generating an resource allocation request and a create media stream port request;
    a resource manager, in response to the resource allocation request, allocating resources of a plurality of multimedia servers;
    a media stream manager, in response to the create media stream port request, creating a media stream port;
    the session manager, in response to the allocation of resources and the creation of the media stream port, launching a selected service of a plurality of multimedia services in the plurality of multimedia servers, the selected service to provide multimedia information to the set-top box via the media stream port connected to the network.

2. The system of claim 1 further comprising:
    a memory storing the plurality of multimedia services in a hierarchical tree structure, the hierarchical tree structure including nodes, each node representing one the plurality of multimedia services, the plurality of multimedia services including a composite service, the composite service including an elemental service, the elemental service typed as an optional service or a required service.

3. The system of claim 1 wherein each of the plurality of multimedia services further comprises:
    multimedia content;
    means, responsive to commands received from the set-top box, for accessing and transporting the multimedia content to the set-top box via the media stream port.

4. The system of claim 2 wherein the selected service is a composite service, and
    wherein the session manger, in response to receiving a registered services information request from the set-top box and an identity of the set-top box and a subscriber, supplying the set-top box with information describing a sub-set of the plurality of multimedia services accessible by the set-top box; and
    the session manger, in response to receiving an open request from the set-top box, executing the selected service in the plurality of multimedia servers, the plurality of multimedia servers communicating directly with the set-top box while executing the selected service.

5. The system of claim 2 wherein the selected service is a composite service, and
    wherein the session manager, while launching the composite service, launching the elemental service typed as required services of the composite service.

6. The system of claim 4 further comprising:
    a subscriber database authenticating the identity of the set-top box and the subscriber.

7. The system of claim 1 further comprising:
    a proxy client, the proxy client service to receive commands from the set-top box, the proxy-client translating the commands into remote procedure calls for the selected service.

8. The system of claim 3 wherein the plurality of multimedia services include an asset service, the asset service navigating the multimedia content.

9. The system of claim 1 wherein the allocated resources comprise processors, memory, disk, and network bandwidth.

10. The system of claim 2 wherein the nodes of the hierarchical tree structure are organized by content providers, and further comprising:
    a provider client application for each content provider, the provider client application adding a new multimedia service to the hierarchical tree structure.

11. The system of claim 3, wherein the commands further comprise play, pause, and read functions.

12. The system of claim 3 wherein the multimedia content includes stream content, file content, and database content.

13. The system of claim 3 wherein the media stream port encodes the multimedia content while transporting the multimedia content to the set-top box.

14. A method for distributing interactive multimedia services; comprising:
    receiving an attach request from a set-top box in a session manager of a plurality of multimedia servers connected to the set-top box by a network;
    generating a resource allocation request by the session manager in response to the attach request;
    allocating resources by a resource manager of the plurality of multimedia servers to in response to the resource allocation request;
    creating a media stream port by a media stream manager of the plurality of multimedia servers to transport multimedia content to the set-top box in response to the attach request; and
    launching a selected service by the session manager of a plurality of multimedia services in the allocated resources of the plurality of multimedia servers, the selected service to transport the multimedia content to the set-top box.

* * * * *